(12) United States Patent
Bae

(10) Patent No.: US 12,015,970 B2
(45) Date of Patent: Jun. 18, 2024

(54) COMMUNICATION APPARATUS, VEHICLE HAVING THE SAME AND CONTROL METHOD FOR CONTROLLING THE VEHICLE

(71) Applicants: Hyundai Motor Company, Seoul (KR); Kia Corporation, Seoul (KR)

(72) Inventor: Jungnam Bae, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 331 days.

(21) Appl. No.: 17/524,106

(22) Filed: Nov. 11, 2021

(65) Prior Publication Data

US 2022/0070639 A1 Mar. 3, 2022

Related U.S. Application Data

(62) Division of application No. 16/206,609, filed on Nov. 30, 2018, now Pat. No. 11,190,914.

(30) Foreign Application Priority Data

Sep. 4, 2018 (KR) .......................... 10-2018-0105329

(51) Int. Cl.
  *H04W 4/00* (2018.01)
  *H04W 4/46* (2018.01)
  (Continued)

(52) U.S. Cl.
  CPC ............. *H04W 4/46* (2018.02); *H04W 36/30* (2013.01); *H04W 72/0453* (2013.01);
  (Continued)

(58) Field of Classification Search
  CPC ... H04W 4/46; H04W 36/30; H04W 72/0453; H04W 72/541; H04W 4/024;
  (Continued)

(56) References Cited

U.S. PATENT DOCUMENTS 10,121,376 B2 11/2018 She et al.
10,491,312 B1 * 11/2019 Shimizu ............... H04B 1/3822
(Continued)

FOREIGN PATENT DOCUMENTS

CN 104520676 A 4/2015
CN 107918385 A 4/2018
(Continued)

OTHER PUBLICATIONS

European Search Report issued on Jul. 5, 2019 from the corresponding European Application No. 18210699.7, 42 pages.
(Continued)

*Primary Examiner* — Thai D Hoang
(74) *Attorney, Agent, or Firm* — Slater Matsil, LLP

(57) ABSTRACT

A communication apparatus includes a band pass filter and a peak detector configured to detect a peak of a communication signal using a second communication protocol among the communication signals received by the antenna. A subtractor connected to the band pass filter and configured to subtract the communication signal using the second communication protocol from the communication signals received by the antenna. A switch is provided between the subtractor and the peak detector. A denoise filter configured to remove a noise from the communication signals received by the antenna, increase a sensitivity of a communication signal using a first communication protocol, and remove the communication signal using the second communication protocol among the communication signals received by the antenna by treating the communication signal using the second communication protocol as a noise.

12 Claims, 13 Drawing Sheets

(51) Int. Cl.
*H04W 36/30* (2009.01)
*H04W 72/0453* (2023.01)
*H04W 72/541* (2023.01)
*H04W 4/024* (2018.01)
*H04W 84/00* (2009.01)

(52) U.S. Cl.
CPC .......... *H04W 72/541* (2023.01); *H04W 4/024* (2018.02); *H04W 84/005* (2013.01)

(58) Field of Classification Search
CPC .. H04W 84/005; H04W 72/542; B60R 16/02; B60W 50/00; H04B 1/401; H04B 1/3822; H04B 1/525
See application file for complete search history.

(56) References Cited

U.S. PATENT DOCUMENTS

| | | | |
|---|---|---|---|
| 10,504,094 B1* | 12/2019 | Gaudin | G07C 9/257 |
| 10,530,451 B1* | 1/2020 | Bansal | H04W 4/40 |
| 10,576,880 B1* | 3/2020 | Hecht | B60Q 1/543 |
| 10,949,831 B1* | 3/2021 | Gaudin | G06Q 20/367 |
| 11,190,914 B2* | 11/2021 | Bae | H04W 4/46 |
| 11,290,708 B2* | 3/2022 | Haskin | H04N 5/04 |
| 11,563,932 B2* | 1/2023 | Haskin | H04N 5/265 |
| 11,849,105 B2* | 12/2023 | Haskin | H04N 5/265 |
| 11,919,515 B2* | 3/2024 | Tsuji | B60W 30/16 |
| 11,919,516 B2* | 3/2024 | Switkes | G08G 1/202 |
| 11,919,547 B1* | 3/2024 | Komori | B60W 30/182 |
| 11,922,805 B1* | 3/2024 | Hansen | G08G 1/095 |
| 11,924,731 B2* | 3/2024 | Möhlmann et al. | H04W 4/90 |
| 2008/0027635 A1* | 1/2008 | Tengler | G01C 21/36 |
| | | | 340/995.19 |
| 2009/0291644 A1 | 11/2009 | Suwa et al. | |
| 2010/0234071 A1* | 9/2010 | Shabtay | H04B 7/155 |
| | | | 455/562.1 |
| 2010/0250106 A1* | 9/2010 | Bai | G08G 1/096791 |
| | | | 701/117 |
| 2013/0262648 A1* | 10/2013 | Orlik | H04W 28/0236 |
| | | | 709/223 |
| 2016/0150451 A1 | 5/2016 | Barreto De Miranda Sargento et al. | |
| 2017/0134059 A1 | 5/2017 | Eskridge, Jr. et al. | |
| 2017/0374530 A1 | 12/2017 | Ramasamy | |
| 2018/0288589 A1 | 10/2018 | Punithan et al. | |
| 2022/0070639 A1* | 3/2022 | Bae | H04W 72/0453 |
| 2022/0268604 A1* | 8/2022 | Ham | H02K 24/00 |
| 2023/0398990 A1* | 12/2023 | Nishiguchi | B60W 30/18163 |
| 2023/0403595 A1* | 12/2023 | Shuman | H04W 28/0215 |
| 2024/0051526 A1* | 2/2024 | Baba | B60W 40/105 |
| 2024/0051531 A1* | 2/2024 | Inoue | B60W 30/12 |
| 2024/0061119 A1* | 2/2024 | Gum | G01C 21/1656 |
| 2024/0067229 A1* | 2/2024 | Inoue | G06V 20/588 |
| 2024/0075942 A1* | 3/2024 | Christensen | B60W 50/0098 |
| 2024/0078903 A1* | 3/2024 | Park | G08G 1/0116 |

FOREIGN PATENT DOCUMENTS

| | | | | |
|---|---|---|---|---|
| JP | 2017208615 A | | 11/2017 | |
| WO | WO-0133748 A1 * | | 5/2001 | .......... A61B 5/1113 |
| WO | 2018036611 A1 | | 3/2018 | |

OTHER PUBLICATIONS

Intel Corporation, "Design considerations on LTE-V2V coexistence with DSRC technology"; 3GPP Draft; R1-1609458 Intel DSRC, 3rd Generation Partnership Project; 3 GPP TSG RAN WG1 Meeting #86bis Lisbon, Portugal, Oct. 10-14, 2016; 7 pages.

Qualcomm Incorporated, "Co-channel coexistence for DSRC and LTE- V2V"; 3GPP Draft; R1-1611593—Qualcomm DSRC-3GPP TSG-RAN WG1 #87 Reno, USA, Nov. 14-18, 2016; 12 pages.

Intel Corporation, "Design considerations on LTE-V2V coexistence with DSRC technology", 3GPP TSG RAN WG1 Meeting #86bis, R1-1609458, Lisbon, Portugal, Oct. 10-14, 2016, 9 pages.

* cited by examiner

FIG. 8
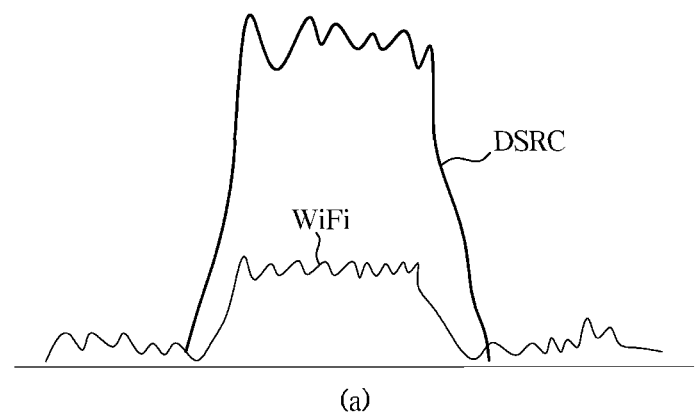
(a)
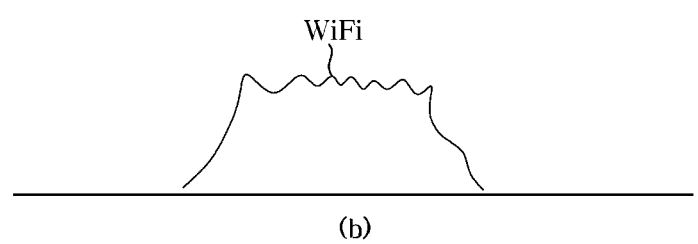
(b)
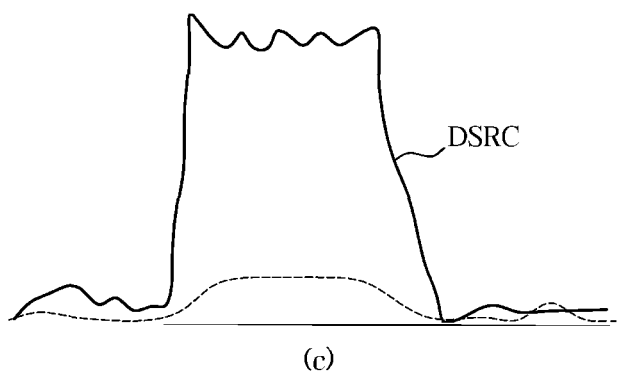
(c)

FIG. 10
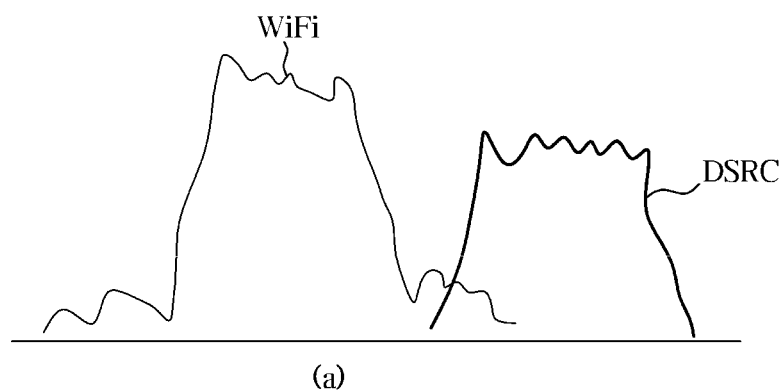
(a)
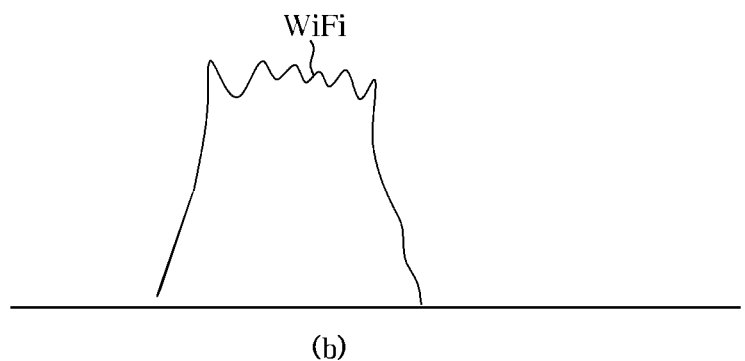
(b)
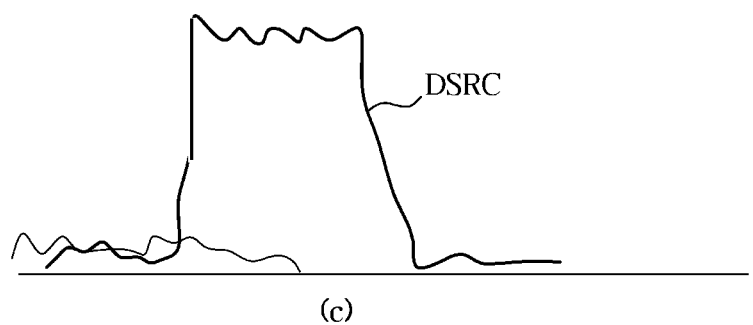
(c)

FIG.12
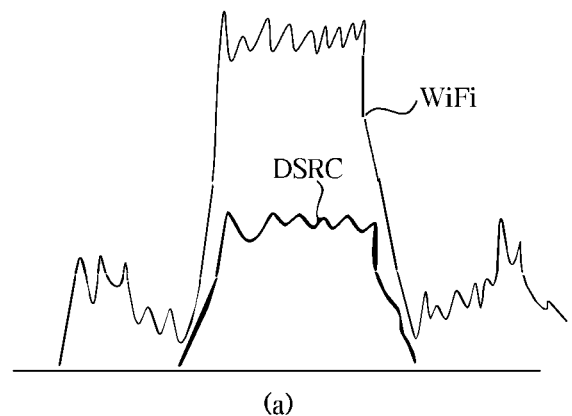
(a)
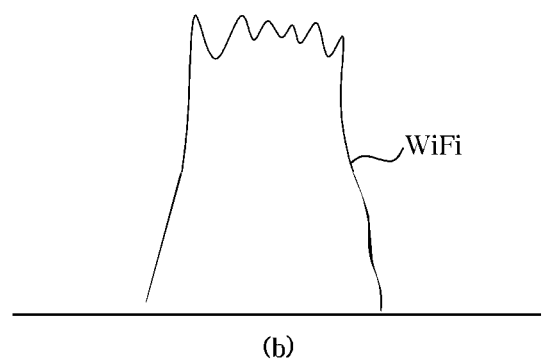
(b)
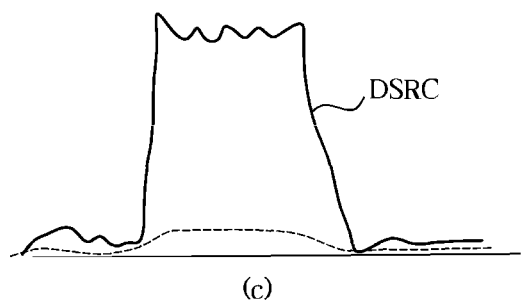
(c)

COMMUNICATION APPARATUS, VEHICLE HAVING THE SAME AND CONTROL METHOD FOR CONTROLLING THE VEHICLE

CROSS-REFERENCE TO RELATED APPLICATIONS

This application is a divisional application of U.S. patent application Ser. No. 16/206,609, filed on Nov. 30, 2018, which claims priority to Korean Patent Application No. 10-2018-0105329, filed on Sep. 4, 2018, which applications are hereby incorporated herein by reference.

TECHNICAL FIELD

Forms of the present disclosure relate to a communication apparatus configured to improve the communication performance with other vehicle, a vehicle having the same, and a method for controlling the vehicle.

BACKGROUND

The statements in this section merely provide background information related to the present disclosure and may not constitute prior art.

A vehicle is a machine that drives a road by driving a wheel, and the vehicle is equipped with a variety of devices for safety of passenger, driving assistant, and ride comfort.

In addition to basic driving functions, the vehicle performs additional functions for user convenience such as audio function, video function, navigation function, air conditioner control, seat control and lighting control.

The vehicle may be provided with an audio video navigation (AVN) device in which navigation, audio and video functions are integrated.

The vehicle also communicates with a terminal capable of an audio function, a video function, a navigation function, a map function, a telephone function, a radio function, a broadcast function, a text message service function, and an Internet function.

A navigation mode performing the navigation function represents a function for guiding a user to a destination according to a route. The navigation mode is performed by calculating a current position of the vehicle by receiving position information from satellites through multi global positioning system (GPS), performing map matching the calculated position on a map and displaying it, performing a route search from the calculated current position to the destination according to a pre-selected route search algorithm by receiving the destination from a user, matching the searched route with the map and displaying it, and guiding the user to the destination based on the route.

The vehicle performs an autonomous driving mode that automatically moves to the destination by using the navigation function, an obstacle recognition function, a lane recognition function, a communication function with the infrastructure and a communication function with other vehicles.

Further, the vehicle shares traffic jam information, adjacent vehicle driving information, road condition information, and message information among vehicles through intelligent transportation system (ITS) services, which is based on the advance in the sensor and communication technology, thereby performing the route guidance and the autonomous driving.

SUMMARY

Therefore, it is an aspect of the present disclosure to provide a communication apparatus capable of, when communicating with other vehicle by using a frequency of a first band in a first communication method, removing an interference, which is caused by a frequency of a first band used in a second communication method, by treating the frequency of the first band used in the second communication method as a noise, a vehicle having the same and a method for controlling the vehicle.

It is another aspect of the present disclosure to provide capable of removing an interference, which is caused by a frequency of a first band used in a second communication method, when communicating with other vehicle by using a frequency of a second band in a first communication method, a vehicle having the same and a method for controlling the vehicle.

It is another aspect of the present disclosure to provide a communication apparatus capable of, when communicating with other vehicle by using a frequency of a first band in a first communication method, removing an interference, which is caused by a frequency of a first band used in a second communication method, by subtracting a signal for the frequency of the first band used in the second communication method, a vehicle having the same and a method for controlling the vehicle.

Additional aspects of the present disclosure will be set forth in part in the description which follows and, in part, will be obvious from the description, or may be learned by practice of the present disclosure.

In accordance with an aspect of the disclosure, a vehicle includes a communication apparatus configured to communicate with other vehicle by using a frequency of a first band and a frequency of a second band in a first communication method, a controller configured to allow the communication apparatus to perform the communication by using the frequency of the first band when an electric field of a communication signal of a second communication method received by the communication apparatus is less than a reference electric field, the controller configured to identify a usage rate of the frequency of the second band when the electric field of the communication signal of the second communication method is equal to or greater than the reference electric field, the controller configured to allow the communication apparatus to perform the communication by using the frequency of the second band when the identified usage rate is equal to or less than a reference usage rate, and the controller configured to allow the communication apparatus to perform the communication by using the frequency of the first band when the identified usage rate exceeds the reference usage rate, and a storage configured to store information on the frequency of the first band and the frequency of the second band.

The vehicle may further include a peak detector configured to detect a peak of the communication signal of the second communication method, and the controller may recognize an electric field of the communication signal of the second communication method based on the detected peak.

Upon communicating with other vehicle by using the frequency of the first band, the communication apparatus may remove the communication signal of the second communication method by treating the communication signal of the second communication method as a noise.

Upon communicating with other vehicle by using the frequency of the second band, the communication apparatus may remove the communication signal of the second communication method by treating the communication signal of the second communication method as a noise.

Upon communicating with other vehicle by using the frequency of the first band, the communication apparatus may subtract the communication signal of the second communication method from the communication signals received by the communication apparatus.

The controller may receive information on electric field intensity of a particular region from at least one of other vehicle and an infrastructure, and identify whether the particular region is a strong electric field region or a weak electric field region of the communication signal of the second communication method, based on the received electric field intensity information.

When it is identified that the particular region is the strong electric field region of the communication signal of the second communication method, the controller may receive the frequency of the second band from other vehicle leaving the particular region.

When information on any one channel among a plurality of channels having the frequency of the second band is received from the infrastructure, the controller may change a channel of the communication apparatus based on the received channel information.

The communication apparatus of the vehicle may further include a band pass filter configured to transmit a communication signal having a frequency equal to or greater than a preselected frequency, among communication signals received by an antenna, a peak detector configured to detect a peak of the communication signal of the second communication method among communication signals received by the antenna, and configured to transmit the detected peak to the controller, a subtractor connected to the band pass filter, a switch provided between the subtractor and the peak detector, and a denoise filter configured to remove a noise in the communication signal received by the antenna to increase a sensitivity of a communication signal of the first communication method.

When the electric field of the communication signal of the second communication method received by the antenna is less than the reference electric field, the controller of the vehicle may turn off the switch to prevent the communication signal of the second communication method from being transmitted to the subtractor.

When the electric field of the communication signal of the second communication method received by the antenna is equal to or greater than the reference electric field, and the identified usage rate is equal to or less than the reference usage rate, the controller of the vehicle may turn off the switch to prevent the communication signal of the second communication method from being transmitted to the subtractor of the communication apparatus.

When the electric field of the communication signal of the second communication method received by the antenna is equal to or greater than the reference electric field, and the identified usage rate exceeds the reference usage rate, the controller of the vehicle may turn on the switch provided in the communication apparatus, the switch in an on operation may transmit the communication signal of the second communication method to the subtractor, and the subtractor may subtract a communication signal for Wi-Fi communication transmitted through the switch, from communication signals passing through the band pass filter.

In accordance with another aspect of the disclosure, a communication apparatus includes a band pass filter configured to transmit a communication signal having a frequency equal to or greater than a preselected frequency, among communication signals received by an antenna, a peak detector configured to detect a peak of a communication signal for Wi-Fi communication among the communication signals received by the antenna, a subtractor connected to the band pass filter, a switch provided between the subtractor and the peak detector, the switch configured to be turned on or off based on a peak detected by the peak detector, and the switch configured to transmit a communication signal for Wi-Fi communication to the subtractor during the switch is in an on operation, a denoise filter configured to remove a noise from the communication signals received by the antenna and configured to increase a sensitivity of a communication signal for Dedicated Short Range Communication (DSRC). The subtractor subtracts the communication signal for Wi-Fi communication transmitted through the switch, from the communication signals received by the antenna, and the denoise filter removes the communication signal for Wi-Fi communication among communication signals received by the antenna, by treating the communication signal for Wi-Fi communication as a noise.

The antenna of the communication apparatus may receive a communication signal having a frequency of a first band of DSRC and receive a communication signal having a frequency of a first band of Wi-Fi communication.

The communication apparatus may further include a buffer provided between the band pass filter and the subtractor and configured to synchronize a communication signal for Wi-Fi communication, which is transmitted from the switch when the switch is turned on, with a communication signal for Wi-Fi communication, which is transmitted from the band pass filter.

In accordance with another aspect of the disclosure, a control method for a vehicle communicating with other vehicle by using a frequency of a first band and a frequency of a second band in a first communication method, the control method includes identifying an electric field of a communication signal of a second communication method received by an antenna, performing a communication by using the frequency of the first band when the electric field of the communication signal of the second communication method received by the antenna is less than a reference electric field, identifying a usage rate of the frequency of the second band when the electric field of the communication signal of the second communication method is equal to or greater than the reference electric field, performing a communication by using the frequency of the second band when the identified usage rate is equal to or less than a reference usage rate, and performing a communication by using the frequency of the first band when the identified usage rate exceeds the reference usage rate.

The identification of the electric field of the communication signal of the second communication method may include detecting a peak of the communication signal of the second communication method, and identifying the electric field of the communication signal of the second communication method based on the detected peak.

The performance of the communication by the frequency of the first band may include removing the communication signal of the second communication method by treating the communication signal of the second communication method as a noise.

The performance of the communication by the frequency of the second band may include removing the communication signal of the second communication method by treating the communication signal of the second communication method as a noise.

The performance of the communication by the frequency of the first band may include subtracting the communication signal of the second communication method from communication signals received by the antenna.

The identification of the electric field of the communication signal of the second communication method may include receiving an electric field intensity of a region in which an infrastructure is installed, from the infrastructure, and identifying whether the received electric field intensity is a strong electric field or a weak electric field.

The control method may further include turning off a switch provided in a communication apparatus to prevent the communication signal of the second communication method from being transmitted to a subtractor of the communication apparatus, when the electric field of the communication signal of the second communication method received by the antenna is less than the reference electric field, The control method may further include turning off a switch provided in a communication apparatus to prevent the communication signal of the second communication method from being transmitted to a subtractor of the communication apparatus, when the electric field of the communication signal of the second communication method received by the antenna is equal to or greater than the reference electric field, and the identified usage rate is equal to or less than the reference usage rate.

The control method may further include turning on a switch provided in the communication apparatus to allow the communication signal of the second communication method to be transmitted to a subtractor of the communication apparatus, when the electric field of the communication signal of the second communication method received by the antenna is equal to or greater than the reference electric field, and the identified usage rate exceeds the reference usage rate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 8 is a view illustrating processing of signal received by the communication apparatus in a weak electric field region upon the communication of the vehicle in one form of the present disclosure;

FIG. 10 is a view illustrating processing of signal upon a channel assignment of the communication apparatus in a strong electric field region upon the communication of the vehicle in one form of the present disclosure;

FIG. 12 is a view illustrating processing of signal upon channel change of the communication apparatus in a strong electric field region upon the communication of the vehicle in one form of the present disclosure.

Figure 1:
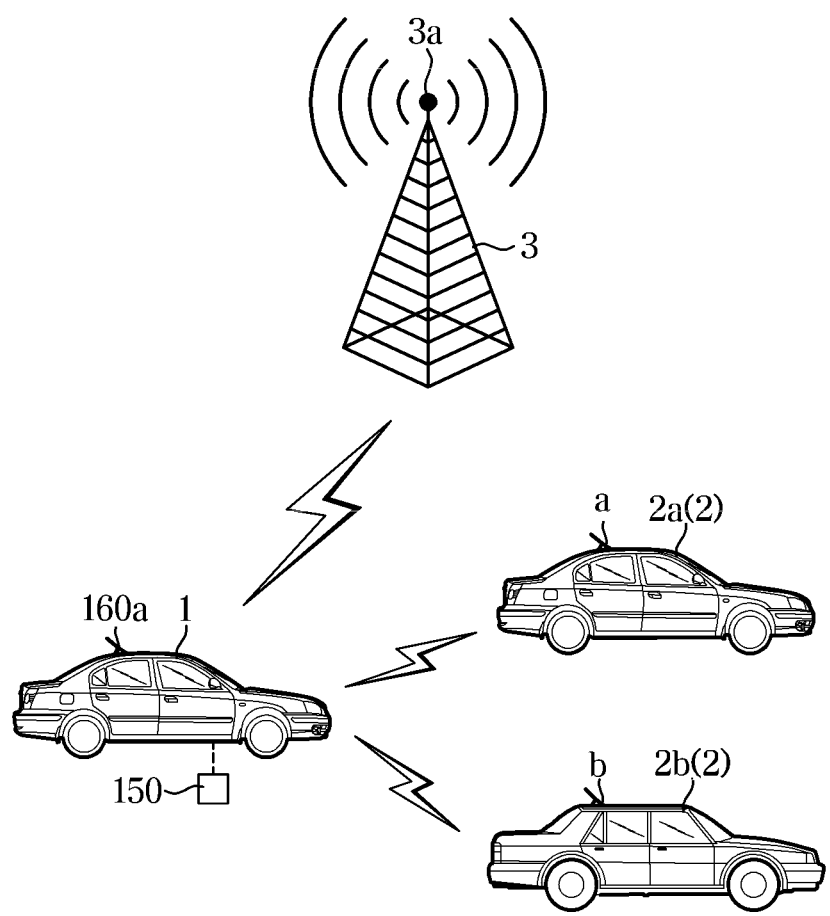
FIG. 1 is a view illustrating a communication of a vehicle in one form of the present disclosure.

The drawings described herein are for illustration purposes only and are not intended to limit the scope of the present disclosure in any way.

The following reference numerals can be used in conjunction with the drawings:
1: vehicle
2: other vehicle
110: detector
1120: image acquirer
130: user interface
140: position receiver
150: controller
160: communication apparatus

DETAILED DESCRIPTION OF ILLUSTRATIVE EMBODIMENTS

The following description is merely exemplary in nature and is not intended to limit the present disclosure, application, or uses. It should be understood that throughout the drawings, corresponding reference numerals indicate like or corresponding parts and features.

In the following description, like reference numerals refer to like elements throughout the specification. Well-known functions or constructions are not described in detail since they would obscure the one or more exemplar forms with unnecessary detail. Terms such as "unit", "module", "member", and "block" may be embodied as hardware or software. According to forms, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each step may be implemented in the order different from the illustrated order unless the context clearly indicates otherwise.

Reference will now be made in detail to some forms of the present disclosure, examples of which are illustrated in the accompanying drawings.

FIG. 1 is a view illustrating a communication of a vehicle in some forms of the present disclosure and it will be described with reference to FIGS. 2 and 3.

Figure 2:
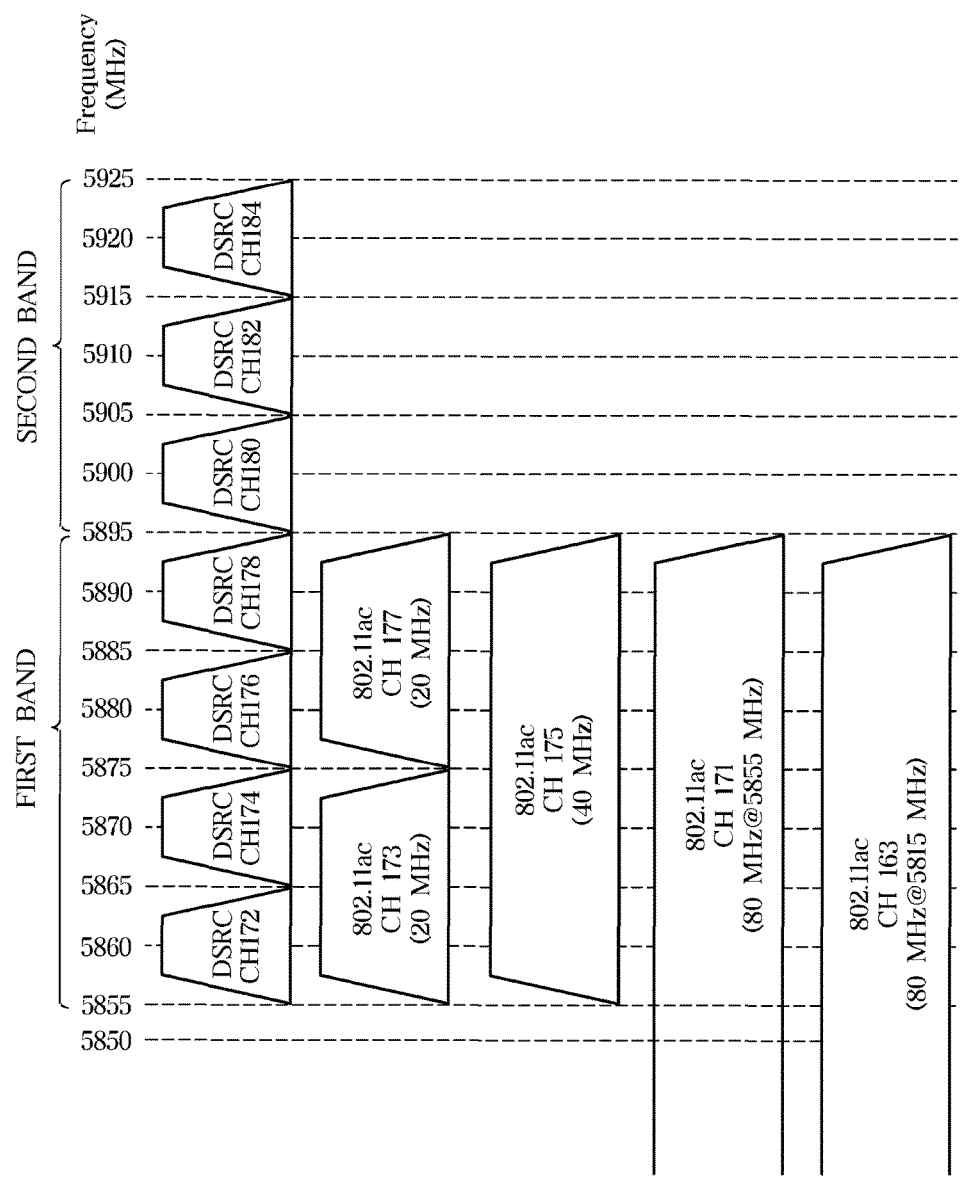
FIG. 2 is a view illustrating a communication frequency of an infrastructure communicating with the vehicle in one form of the present disclosure.
Figure 3:
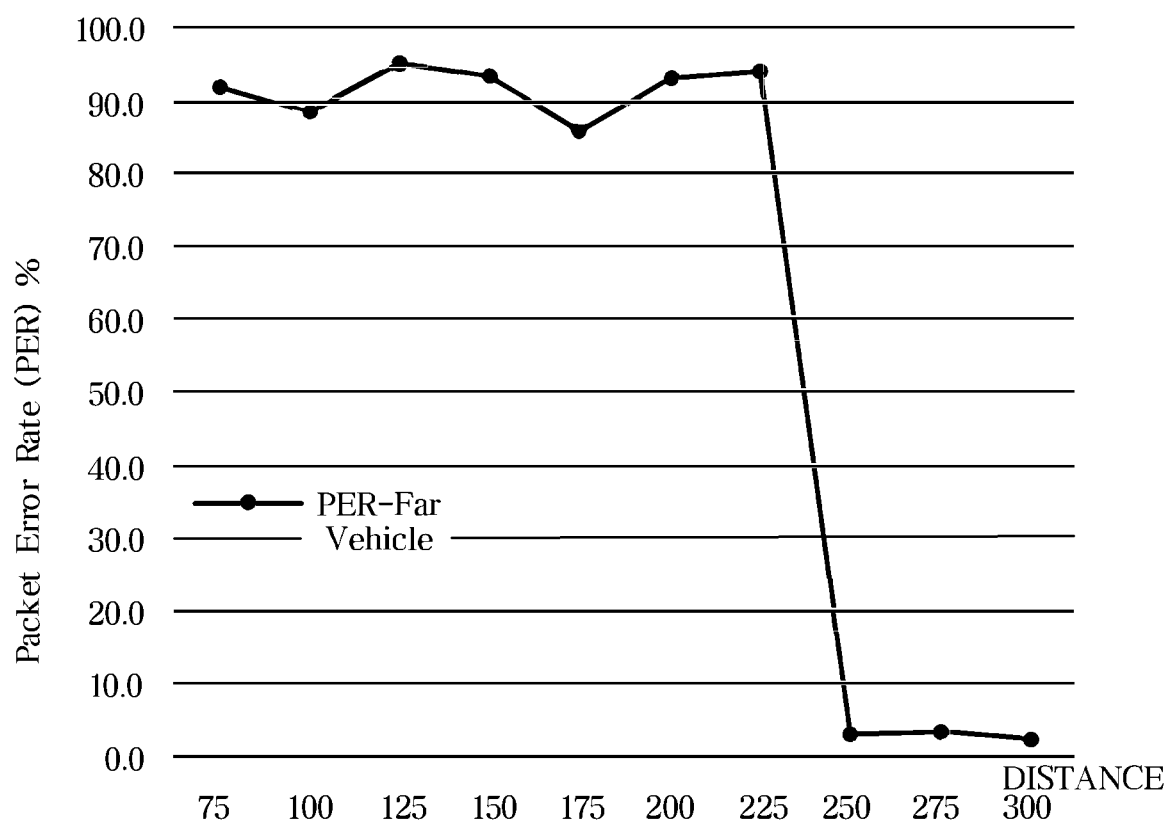
FIG. 3 is a graph illustrating a packet error rate corresponding to a distance between the vehicle and the infrastructure in one form of the present disclosure.

FIG. 2 is a view illustrating a communication frequency of an infrastructure communicating with the vehicle in some forms of the present disclosure and FIG. 3 is a graph illustrating a packet error rate corresponding to a distance between the vehicle and the infrastructure in some forms of the present disclosure.

FIG. 1 is a view illustrating a communication between a user's own vehicle 1 (hereinafter referred to as "vehicle") and at least one other vehicle 2: 2a and 2b and a communication between the vehicle 1 and the infrastructure 3.

The vehicle 1 may radiate electromagnetic waves to the outside through an antenna 160a.

In this case, the antenna 160a may emit an electromagnetic wave corresponding to electrical signals transmitted from a controller 150 provided in the vehicle 1.

The other vehicle 2 (2a) may receive the electromagnetic wave emitted through the antenna 160a of the vehicle 1 via an antenna (a). At this time, the other vehicle 2a may receive the electromagnetic wave emitted from the vehicle 1 through the antenna (a), convert the received electromagnetic wave into an electrical signal, and generate a control signal corresponding to the electrical signals, thereby using the control signal for controlling the other vehicle 2a.

The other vehicle 2 (2b) may receive the electromagnetic wave emitted through the antenna 160a of the vehicle 1 via an antenna (b). At this time, the other vehicle 2b may receive the electromagnetic wave emitted from the vehicle 1 through the antenna (b), convert the received electromagnetic wave into an electrical signal, and generate a control signal corresponding to the electrical signals, thereby using the control signal for controlling the other vehicle 2b.

The other vehicle 2 (2a) may generate an electrical signal based on a control signal transmitted from a controller (not shown) of the other vehicle 2 (2a) via the antenna (a) and emit an electromagnetic wave corresponding to the electrical signal.

The other vehicle 2 (2b) may generate an electrical signal based on a control signal transmitted from a controller (not shown) of the other vehicle 2 (2b) via the antenna (b) and emit an electromagnetic wave corresponding to the electrical signal.

The vehicle 1 may receive an electromagnetic wave emitted from at least one of the other vehicle 2a or the other vehicle 2b through the antenna 160a, and convert the received electromagnetic wave into an electrical signal.

A drive module of the antenna of the vehicle 1 may demodulate the received electromagnetic wave, convert it to an electrical signal and transmit the electrical signal to the controller 150. At this time, the controller 150 of the vehicle 1 may generate a control signal corresponding to the electrical signal and use the control signal for controlling the vehicle 1.

The vehicle 1 may perform a communication with other vehicle (V2V communication).

In addition, the vehicle may receive an electromagnetic wave emitted from an infrastructure 3 on the road or emit an electromagnetic wave to the infrastructure 3 on the road. The infrastructure 3 may transmit and receive a communication signal of a first communication method and a communication signal of a second communication method.

The communication signal of the first communication method is a signal having a frequency of a first band and a frequency of a second band. The communication signal of the second communication method is a signal having a frequency of a first band and a frequency lower than the frequency of the first band.

The frequency of the first band may be lower than the frequency of the second band. In other words, the frequency of the first band is a frequency of the low band, and the frequency of the second band may be a frequency of the high band.

The first communication method is Dedicated Short Range Communication (DSRC) for communicating with a vehicle and the second communication method is Wireless Fidelity (Wi-Fi) communication.

The infrastructure 3 may perform the communication based on DSRC and Wi-Fi communication for communicating with a vehicle. The infrastructure 3 may be a base station that performs the communication based on Wi-Fi communication. The frequency of the first band may be lower than the frequency of the second band. In other words, the frequency of the first band is a frequency of the low band, and the frequency of the second band may be a frequency of the high band.

The infrastructure 3 may transmit and receive a frequency for Wi-Fi communication and transmit and receive a frequency for DSRC. The infrastructure 3 may include an antenna, a controller and a memory.

An installation position of the infrastructure 3 may be fixed, and the frequency for Wi-Fi communication may be preset. Accordingly, the memory of the infrastructure may store channel information based on DSRC that is available in a region where the infrastructure is located.

The channel information based on DSRC may include DSRC frequency or information of frequency band that can minimize the interference of Wi-Fi communication frequency in the region where the infrastructure is located.

The infrastructure 3 may transmit the channel information based on DSRC stored in the memory, to a vehicle that enters the region where the infrastructure 3 is located.

The infrastructure 3 may receive the electromagnetic wave emitted from the antenna 160a of the vehicle 1 through an antenna 3a, and obtain information provided from the vehicle 1 or generate a control signal by using an electric signal corresponding to the received electromagnetic wave.

The controller of the infrastructure 3 may transmit the electrical signal, the control signal generated according to the electrical signal, and the information acquired based on the electrical signal, to an external server (not shown) through a separate cable.

In addition, the controller of the infrastructure 3 may allow the generated control signal or information to be emitted as an electromagnetic wave through the antenna 3a. At this time, a vehicle in the vicinity of the infrastructure 3 may receive the electromagnetic wave emitted from the infrastructure 3.

That is, the antenna 160a of the vehicle 1 may receive the electromagnetic wave transmitted from the antenna 3a of the infrastructure 3. The controller 150 of the vehicle 1 may control the display of the vehicle 1 by generating a control signal for a variety of components of the vehicle 1, such as a display of the vehicle, based on an electrical signal corresponding to the received electromagnetic wave. Therefore, the controller 150 of the vehicle 1 may allow the display to display information corresponding to the electrical signal.

Accordingly, it may be possible to perform a vehicle to infrastructure (V2I) communication between the vehicle 1 and the infrastructure (i.e., the structure).

As illustrated in FIG. 2, the communication based on DSRC may perform the communication using a frequency of a first band having a frequency range of 5855-5895 MHz and a frequency of a second band having a frequency range of 5855-589 5 MHz. Wi-Fi communication may perform the communication using 2400-2483 MHz frequency and 5000 MHz-5895 MHz frequency.

Among the frequency of the first band used for DSRC, 5855-5864 MHz may be set to a first channel CH172, 5865-5874 MHz may be set to a second channel CH174, 5875-5884 MHz may be set to a third channel CH176, and 5885-5894 MHz may be set to a fourth channel CH178.

Among the frequency of the second band used for DSRC, 5895-5904 MHz may be set to a fifth channel CH180, 5905-5914 MHz may be set to a sixth channel CH182, and 5915-5925 MHz may be set to a seventh channel CH184.

As for DSRC and Wi-Fi communication, a range of frequency used for the communication may be partially same. That is, DSRC and Wi-Fi communication perform the communication using 5855-5895 MHz frequency.

Accordingly, vehicle and infrastructure may perform different communications by using the same frequency.

As illustrated in FIG. 3, when the infrastructure 3 performs Wi-Fi communication using 5855-5895 MHz frequency, and the vehicle 1 performs DSRC using 5855-5895 MHz frequency, the infrastructure 3 and the vehicle 1 may perform the different communication using the same frequency in a particular region, and the interference may occur between DSRC and Wi-Fi communication. Therefore, as a distance between the vehicle 1 and the infrastructure 3 is reduced, packet error rate may be increased, but as the distance between the vehicle 1 and the infrastructure 3 is increased, packet error rate may be reduced.

In some forms of the present disclosure, the vehicle 1 may reduce the interference caused by Wi-Fi communication signal, by removing Wi-Fi communication signal of the infrastructure, thereby preventing deterioration of communication performance with other vehicle, and thereby improving communication performance with other vehicle.

A configuration of the vehicle 1 in some forms of the present disclosure will be described with reference to FIG. 4.

Figure 4:
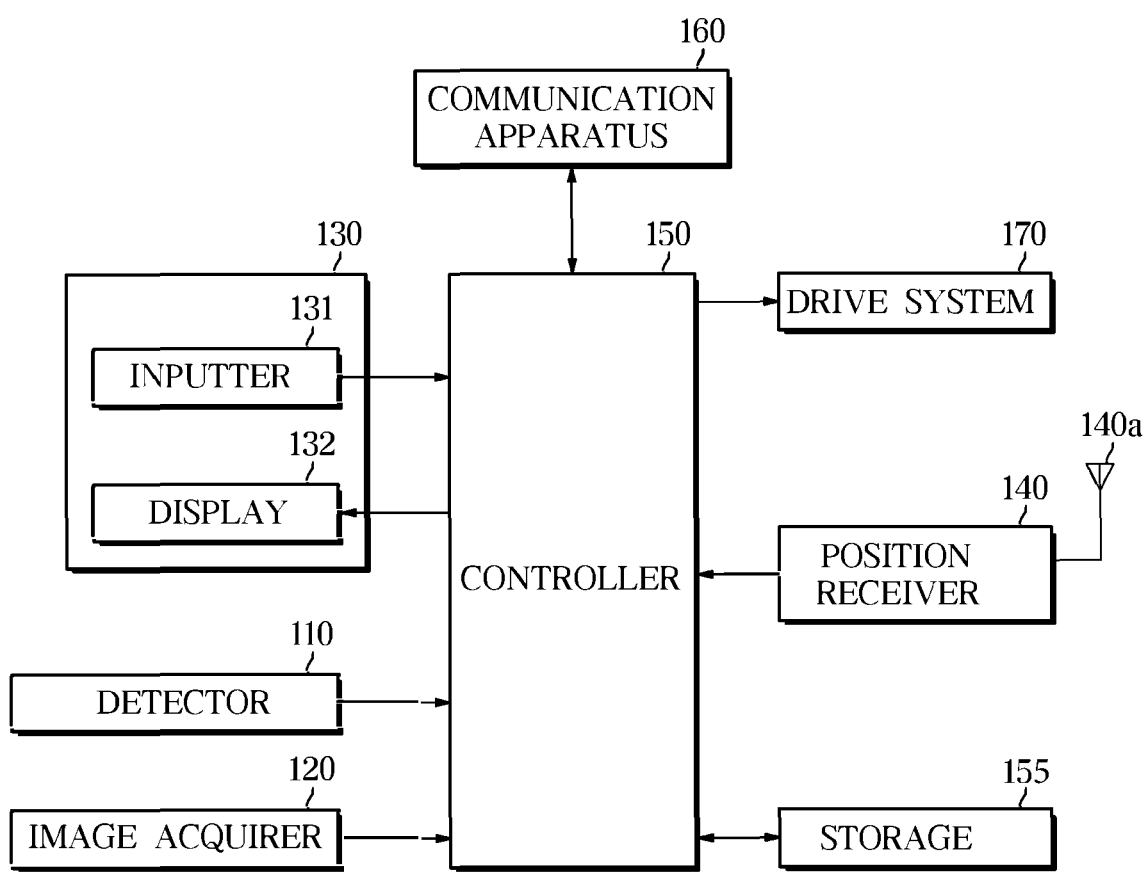
FIG. 4 is a control block diagram illustrating the vehicle in one form of the present disclosure.
Figure 5:
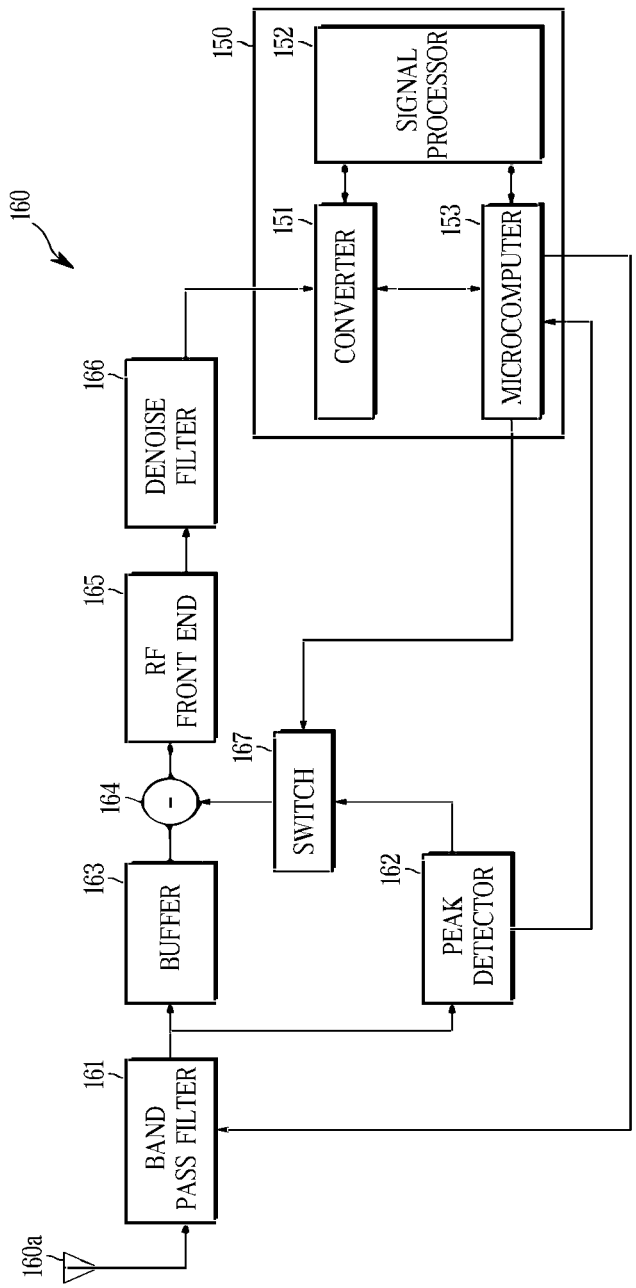
FIG. 5 is a control block diagram illustrating a communication apparatus in the vehicle in one form of the present disclosure.

FIG. 4 is a control block diagram illustrating the vehicle in some forms of the present disclosure and FIG. 5 is a control block diagram illustrating a communication apparatus in the vehicle in some forms of the present disclosure.

The vehicle 1 may include a detector no, an image acquirer 120, a user interface 130, a position receiver 140, a controller 150, a storage 155, a communication apparatus 160, and a drive system 170.

The detector no may detect state information of the vehicle.

The detector no may further include at least one of an angular velocity detector detecting an angular velocity of a steering wheel to detect a steering angle of the vehicle, a speed detector detecting a driving speed of the vehicle, a yaw rate detector detecting a yaw moment of the vehicle, and an acceleration detector detecting an acceleration of the vehicle.

The driving speed of the vehicle may be a speed of the vehicle body.

The speed detector may be a wheel speed sensor provided on front, rear, right, and left vehicle wheels, or an acceleration sensor detecting acceleration of the vehicle.

The detector no may include a distance detector identifying a distance between the vehicle and an object placed outside the vehicle 1. The object may include other vehicle driving in front of the vehicle, a stationary object, such as structures installed in the vicinity of the road, and other vehicle approaching on an opposite lane.

The distance detector may output a signal corresponding to detecting an object on the front, left and right sides of the vehicle at the current position of the vehicle, and transmit a signal corresponding a distance to the detected object to the controller iso.

The distance detector includes a light detection and ranging (LiDAR) sensor.

The LiDAR sensor is a noncontact distance sensor based on the knowledge laser radar.

The distance detector may include an ultrasonic sensor or a radar sensor.

The image acquirer 120 may acquire an image of the road, and transmit the acquired image to the controller iso. The image of the road may be an image of the road in the forward direction with respect to the driving direction of the vehicle.

Particularly, the image detector 120 is a device configured to acquire information of the object and convert the information into an electrical image signal. For example, the image detector acquires information related to an external environment of the vehicle, e.g. a road on which the vehicle drives and an object in the front side and the lateral side, in the current location and transmit an image signal of information of the detected object to the controller iso.

The image acquirer 120 may include CCD or CMOS image sensor, as a camera.

The image acquirer 120 may be provided in a front window glass, particularly a window glass inside of the vehicle, in a room mirror inside of the vehicle, or in the roof panel to be exposed to the outside.

The image detector 120 may be a rear camera, a camera of black box (i.e., dash cam) and a camera of an autonomous driving controller provided for the autonomous driving.

The user interface 130 may further include an inputter 131 receiving a user input from a user, and a display 132 displaying state information of the vehicle, operation information corresponding to a user input, and information transmitted from another vehicle or an infrastructure.

The inputter 131 may include a button, a touchpad and a jog dial provided on the center fascia and the head unit of the vehicle.

The inputter 131 may receive a selection command of an autonomous driving mode. In addition, the inputter 131 may receive a selection command of a manual driving mode in which the vehicle drives based on operation information of a driver.

The inputter 131 may receive a selection command of a navigation mode and receive a destination.

The display 132 may be a display provided in the cluster and the head unit.

The display 132 may display information on an audio function, a video function, a DMB function, a radio function, a navigation mode, and an autonomous driving mode, and display operation information on a function or mode being performed.

In the autonomous driving mode, the display 132 may display an image of the front, rear, left, and right directions, and map information and route guidance information in conjunction with the navigation mode.

The inputter 131 may be a touch panel, and the display 132 may be a display panel.

The user interface 130 may be provided with a touch screen in which a touch panel and a display panel are integrated.

The user interface 130 may communicate with the controller 150 for controlling the navigation mode and the autonomous mode, and perform a display function based on a control command of the controller 150 that is received via the communication.

The position receiver 140 may acquire current position information of the vehicle by receiving position information provided from a plurality of satellites.

The position receiver 140 may include a Global Positioning System (GPS) receiver.

The GPS receiver may include an antenna 140a receiving a signal of a plurality of GPS satellites, software acquiring position of vehicle by using distance and time information corresponding to the position signal of the plurality of GPS satellites, and an outputter outputting the acquired current position information of vehicle.

The controller 150 may be provided in the vehicle and control a variety of the drive system 170 and an additional device (not shown) provided in the vehicle. The controller 150 may be provided in the autonomous driving controller provided for the autonomous driving.

The controller 150 may control the autonomous driving based on user input information of the inputter 131, image information of the image acquirer 120, detection information of the detector 110, position information of the position receiver 140, and information received via the communication apparatus 160.

When a selection command of the navigation mode that is selected via the inputter 131, is received, the controller 150 may identify a current position received through the position receiver 140, confirm a destination selected through the inputter 131, confirm map information stored in the controller iso, search for a route from the current position to the destination, match the searched route with the map, and allow a map with which the route is matched to be displayed on the display 132.

When a selection command of the autonomous driving mode is received, the controller 150 may perform the autonomous driving mode in conjunction with the navigation mode and allow the vehicle to autonomously drive from the current position to the destination by controlling the drive system 170 based on navigation information, image information, distance information, speed information and external information.

The external information may be information received through the communication apparatus, particularly information transmitted from at least one of another vehicle or infrastructure.

In the autonomous driving mode, the controller 150 may identify a position of other vehicle driving on the lane in the left side and the right side of the vehicle, based on information on a distance to an obstacle detected by the distance detector, and identify a distance of the other vehicle corresponding to the identified other vehicle, thereby regulating a speed of the vehicle based on the distance to the identified other vehicle.

In the autonomous driving mode, when an image of the road is received, the controller 150 may recognize a lane of the road by performing the image processing by receiving the image of the road, and recognize a lane on which the vehicle drives, based on the position information of the recognized lane.

In the autonomous driving mode, the controller 150 may control a driving direction (steering) of the vehicle to maintain or change the lane, based on the distance to other vehicle, the current position, the recognized lane, and the searched route.

In the autonomous driving mode, the controller 150 may control the display 132 to display an image about the front, rear, left and right side of the vehicle acquired by the image acquirer 120, and to display map information with which the route is matched and route guidance information in conjunction with the navigation mode.

Navigation information may include destination information and map information, and further include the name of the road in the map, the position information of the road, the type of the road, and the route number of the road.

In addition, the controller 150 may perform the manual driving mode when the autonomous driving mode is released. That is, the controller 150 may allow the speed of the vehicle to be regulated by controlling the power system and the brake system based on operation information of brake pedal and acceleration pedal that is operated by a driver during the manual driving mode, and allow the driving direction of the vehicle to be regulated by controlling the steering system based on steering information of steering wheel that is operated by a driver.

During driving, the controller 150 may control the display 132 to display forward traffic information transmitted from other vehicle, access information of other vehicle, and collision estimation information.

In addition, during driving, the controller 150 may control a speaker (not shown) to output the forward traffic information transmitted from other vehicle, the access information of other vehicle, and the collision estimation information, as a sound.

The controller 150 may transmit the state information of the vehicle 1 and the surrounding information of the vehicle 1 to other vehicle or the infrastructure through the communication apparatus 160, and receive state information of other vehicle 2 and surrounding information of other vehicle 2 through the communication apparatus 160. Therefore, the controller 150 may control at least one operation of the drive system and the additional device of the vehicle, based on the received information.

The surrounding information may include forward traffic information and information on a distance to the other vehicle.

The controller 150 may receive information related to entering a strong electric field region in which electric field intensity of communication signal for Wi-Fi communication is equal to or greater than reference electric field intensity, from the infrastructure 3.

The controller 150 may receive channel information for DSRC, from the infrastructure 3.

The controller 150 may identify whether a communication signal received via the communication apparatus 160 is a communication signal for Wi-Fi communication or a communication signal DSRC, by identifying a protocol contained in the communication signal.

Alternatively, the controller 150 may identify whether the received communication signal is a communication signal for Wi-Fi communication or a communication signal DSRC, by identifying a unique signal contained in the received communication signal. The unique signal may be a signal configured to distinguish the communication method, and the unique signal may include a unique signal for Wi-Fi communication and a unique signal for DSRC.

The controller 150 may receive only a communication signal for DSRC using the frequency of the first band, or only a communication signal for DSRC using the frequency of the second band. The controller 150 may allow the communication with other vehicle to be performed by using the communication signal for DSRC using the frequency of the first band or allow the communication with other vehicle to be performed by using the communication signal for DSRC using the frequency of the second band.

When it is identified that a communication signal for Wi-Fi communication is contained in the received communication signal, the controller 150 may acquire the communication signal for Wi-Fi communication and transmit the acquired communication signal for Wi-Fi communication to the communication apparatus 160, so as to remove the communication signal for Wi-Fi communication from the received communication signal.

The controller 150 may transmit the acquired communication signal for Wi-Fi communication to the communication apparatus 160 to allow the communication signal for Wi-Fi communication contained in the received communication signal to be removed.

The communication signal for Wi-Fi communication may be a communication signal having the frequency of the first band.

The communication signal received by the controller 150 may be a communication signal using a frequency having a magnitude equal to or greater than a pre-selected frequency, and the received communication signal may be a communication signal for DSRC using the frequency of the first band and the frequency of the second band, and a communication signal for Wi-Fi communication using the frequency of the first band.

Particularly, the communication signal for DSRC using the frequency of the first band and the communication signal for Wi-Fi communication using the frequency of the first band may be received by the controller iso. The controller 150 may distinguish the communication signal for DSRC using the frequency of the first band and the communication signal for Wi-Fi communication using the frequency of the first band, from the received communication signal, and transmit the communication signal for Wi-Fi communication using the frequency of the first band to the communication apparatus 160.

The communication signal for DSRC using the frequency of the second band and the communication signal for Wi-Fi communication using the frequency of the first band may be received by the controller iso. The controller 150 may distinguish the communication signal for DSRC using the frequency of the second band and the communication signal for Wi-Fi communication using the frequency of the first band from the received communication signal, and transmit the communication signal for Wi-Fi communication using the frequency of the first band to the communication apparatus 160.

The controller 150 may identify electric field intensity of the communication signal for Wi-Fi communication based on peak information, which is acquired by a peak detector provided in the communication apparatus, and control turning on and off of a switch of the communication apparatus 160 based on the identified electric field intensity.

The controller 150 may control turning on and off of the switch of the communication apparatus 160 when a usage rate of a channel having the frequency of the second band is equal to or greater than a pre-selected reference usage rate.

The controller 150 may select one channel among the plurality of channels of the communication signals for DSRC, and control the communication with another vehicle by using the selected channel.

The storage 155 may store the frequency range of the first band and the frequency range of the second band, and store channel information for each frequency range.

The channel information may include the first channel (CH172) having 5855-5864 MHz frequency, the second channel (CH174) having 5865-5874 MHz frequency, the third channel (CH176) having 5875-5884 MHz frequency, the fourth channel (CH178) having 5885-5894 MHz frequency, the fifth channel (CH180) having 5895-5904 MHz frequency, the sixth channel (CH182) having 5905-5914 MHz frequency, and the seventh channel (CH184) having 5915-5925 MHz frequency.

The first, second, third and fourth channels are channels having the frequency of the first band, and the fifth, sixth, and seventh channels are channels having the frequency of the second band.

A magnitude of the frequency within the frequency range of the first band is smaller than a magnitude of the frequency within the frequency range of the second band. That is, the frequency of the first band is the frequency of the low band and the frequency of the second band is the frequency of the high band.

The storage 155 may also store the channel information of DSRC for each piece of position information. The position information may include position information of the infrastructure installed on the road where the vehicle 1 frequently drives.

The controller 150 may be implemented using a memory (not shown) storing an algorithm for controlling an operation of components in the vehicle and data related to programs implementing the algorithm, and a processor (not shown) performing the above-mentioned operation using the data stored in the memory. The memory and the processor may be implemented in separate chips, or a single chip.

The storage 155 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HOD) and a CD-ROM. The implementation of the storage is not limited thereto. The storage may be a memory that is implemented by a chip separate from the above-mentioned processor related to the controller, or the storage may be implemented by a single chip with a processor.

The communication apparatus 160 may perform the communication with at least one of other vehicle or an infrastructure, and transmit a communication signal, which is received from at least one of another vehicle or the infrastructure, to the controller iso. Based on the control signal of the controller iso, the communication apparatus 160 may transmit a communication signal corresponding to the state information of the vehicle 1, the detection information and the user input information, to at least one of another vehicle or the infrastructure. A configuration of the communication apparatus 160 will be described with reference to FIG. 5.

The communication apparatus 160 may include a wired and wireless communication. The communication apparatus 160 may perform a communication among a variety of internal electronics and a communication with a user terminal.

The drive system 170 may be a device configured to drive the vehicle, and include the brake system, the suspension system, the power generation system, the power transmission system and the steering system.

The vehicle may further include an additional device for the convenience of the user. For example, in addition to the user interface, the additional device may further include a window opening/closing device, an air conditioner, a radio device, a seat position adjusting device, a heating wire of a seat, and a ventilation device.

According to the performance of the components of the vehicle, as illustrated in FIG. 4, at least one component may be added or omitted. In addition, it will be readily understood by those skilled in the art that the mutual position of the components can be changed corresponding to the performance or structure of the system.

Meanwhile, the components illustrated in FIG. 4 represent software and/or hardware components such as Field Programmable Gate Array (FPGA) and Application Specific Integrated Circuit (ASIC).

As illustrated in FIG. 5, the controller 150 may include a converter 151, a signal processor 152, and a microcomputer 153. The converter 151 of the controller 150 may convert a communication signal for DSRC received via the communication apparatus 160 into a digital signal. The signal processor 152 may perform the signal processing such as dividing, compressing and filter processing. The microcomputer 153 may acquire information corresponding to a signal in which the signal processing is performed, and generate a control signal corresponding to the acquired information, thereby controlling an operation of at least one of the drive system and additional device, based on the generated control signal.

As illustrated in FIG. 5, the communication apparatus 160 may include the antenna 160a, a band pass filter 161, a peak detector 162, a buffer 163, a subtractor 164, a RF front end 165, a denoise filter 166 and a switch 167.

The antenna 160a may receive an electromagnetic wave transmitted from the other vehicle 2 and the infrastructure 3, and transmit a communication corresponding to the electromagnetic wave, as an electrical signal to the controller 150.

The communication signal received by the antenna 160a may be a communication signal based on DSRC corresponding to the first communication method using the frequency of the first band, and a communication signal based on DSRC corresponding to the first communication method using the frequency of the second band.

In addition, a communication signal based on Wi-Fi communication may be also received by the antenna 160a.

The antenna 160a may emit an electromagnetic wave corresponding to a control signal of the controller iso.

The band pass filter 161 may transmit a frequency having a magnitude equal to or greater than a magnitude of a preset frequency. That is, the band pass filter may transmit the frequency of the first band and the frequency of the second band.

The preset frequency may be set according to a control command of the controller iso. That is, the band pass filter 161 may transmit only the frequency corresponding to the control command of the controller.

The peak detector 162 may detect a peak of the communication signal passing through the band pass filter 161 and when an electric field intensity corresponding to the detected peak is equal to or greater than the reference electric field intensity, the peak detector 162 may transmit peak detection information to the microcomputer 153.

The peak detector 162 may transmit a communication signal for Wi-Fi communication among communication signals passing through the band pass filter 161, to the subtractor 164 through the switch 167.

The buffer 163 may synchronize the communication signal for Wi-Fi communication among communication signals passing through the band pass filter 161, with a communication signal for removing, transmitted from the peak detector 162.

Alternatively, the buffer 163 may synchronize the communication signal for Wi-Fi communication among communication signals passing through the band pass filter 161, with a communication signal for removing, transmitted from the controller 150.

The buffer 163 may store the communication signal passing through the band pass filter 161 for a preselected period of time.

After receiving the communication signal from the buffer 163, the subtractor 164 may transmit the received communication signal to the RF front end 165.

When receiving the communication signal from the switch 167 since the switch 167 is turned on, the subtractor 164 may subtract the communication signal received through the switch 167, from the communication signal received through the buffer 163. That is, when receiving the communication signal from the switch 167 since the switch 167 is turned on, the subtractor 164 may remove the communication signal received through the switch 167 from the communication signal received through the buffer 163.

Upon receiving the communication signal from the buffer 163, the RF front end 165 may convert the received communication signal into a signal that is readable by the vehicle, and convert the communication signal through the subtractor 164 into a signal that is readable by the vehicle.

The denoise filter 166 may remove the communication signal for Wi-Fi communication by treating the communication signal for Wi-Fi communication as a noise signal. The denoise filter 166 may average the communication signal for DSRC and increase a signal to noise ratio (S/N) of the communication signal for DSRC, thereby increasing the sensitivity of the communication signal for DSRC. Therefore, the denoise filter 166 may transmit the communication signal for DSRC in which the noise is removed and its sensitivity is increased, to the controller iso.

The switch 167 may perform on or off operation in response to the control command of the controller 15o. In an on operation, the switch 167 may transmit a communication signal passing through the peak detector 162, to the subtractor 164, and in an off operation, the switch 167 may transmit a communication signal passing through the buffer 163, to the RF front end 165 through the subtractor 164.

The controller 150 may identify the electric field intensity of the communication signal for Wi-Fi communication based on peak information acquired by the peak detector 162 provided in the communication apparatus. When it is identified that the electric field intensity is equal to or greater than the reference electric field intensity, the controller 150 may turn off the switch 167 of the communication apparatus, the controller 150 may allow the communication signal for Wi-Fi communication to be removed by treating the communication signal for Wi-Fi communication as the noise, thereby increasing the sensitivity of the communication signal for DSRC.

When it is identified that the electric field intensity is equal to or greater than the reference electric field intensity, the controller 150 may identify whether the channel usage rate of the frequency of the second band exceeds a reference usage rate. When it is identified that the channel usage rate of the frequency of the second band is equal to or less than the reference usage rate, the controller 150 may turn off the switch 167 of the communication apparatus 160 and change the communication channel of the communication apparatus 160 into any one channel among the plurality of channels having the frequency of the second band. Changing a channel into a channel having the frequency of the second band may include changing a pass frequency set by the band pass filter 161 of the communication apparatus.

The controller 150 may receive region information on a strong electric field region of the communication signal for Wi-Fi communication, from the infrastructure and store the received region information.

The controller 150 may change a channel for DSRC upon entering the strong electric field region, based on the stored region information.

When the vehicle enters the region in which the identified electric field intensity is equal to or greater than the reference electric field intensity, the controller 150 may receive information on the channel having the frequency of the second band, from another vehicle in the same region, and perform DSRC based on the received channel information. In addition, when the vehicle passes through the same region, the controller 150 may receive information on the channel having the frequency of the first band, from another vehicle passing through the same region and perform DSRC based on the received channel information.

To identify whether the channel usage rate of the frequency of the second band exceeds the reference usage rate, the controller 150 may identify whether the plurality of channels having the frequency of the second band is used in the other vehicle. When it is identified that the plurality of channels is used in the other vehicle, the controller 150 may identify that the channel usage rate of the frequency of the second band exceeds the reference usage rate.

The controller 150 may receive information on a channel that is available in a region in which the infrastructure is located, from the infrastructure and perform DSRC with other vehicle based on the received channel information.

The controller 150 may receive the channel usage rate of the frequency of the second band from the infrastructure and compare the received usage rate with the reference usage rate.

When the identified electric field intensity is equal to or greater than the reference electric field intensity and when it is identified that the channel usage rate of the frequency of the second band is equal to or less than the reference usage rate, the controller 150 may allow the communication signal for Wi-Fi communication to be removed by treating the communication signal for Wi-Fi communication as the noise, thereby increasing the sensitivity of the communication signal for DSRC.

When the identified electric field intensity is equal to or greater than the reference electric field intensity and when it is identified that the channel usage rate of the frequency of the second band exceeds the reference usage rate, the controller 150 may turn on the switch 167 and control an interference removal operation.

That is, the controller 150 may turn on the switch 167 of the communication apparatus 160 to allow the communication signal passing through the peak detector 162 to be transmitted to the subtractor 164 through the switch 167.

The controller 150 may receive information on a channel that is available in a region in which the infrastructure is located, from the infrastructure 3 and perform DSRC with other vehicle based on the received channel information.

The controller 150 may receive information on whether a region, in which other vehicle driving in front of the vehicle is placed, is a strong electric field region or a weak electric field region of the communication signal for Wi-Fi communication, and when it is identified that the region in which other vehicle is placed is the strong electric field region of the communication signal for Wi-Fi communication, the controller 150 may receive the channel for the frequency of the second band from the other vehicle.

That is, when a particular region is the strong electric field region of the communication signal for Wi-Fi communication, the controller 150 may receive the channel for the frequency of the second band from the other vehicle that is leaving the particular region, and perform the communication with still another vehicle by using the received channel for the frequency of the second band.

At this time, while performing the communication with the other vehicle in the particular region through the first communication method, the controller 150 may receive communication environment information related to the second communication method in a particular region.

Figure 6:
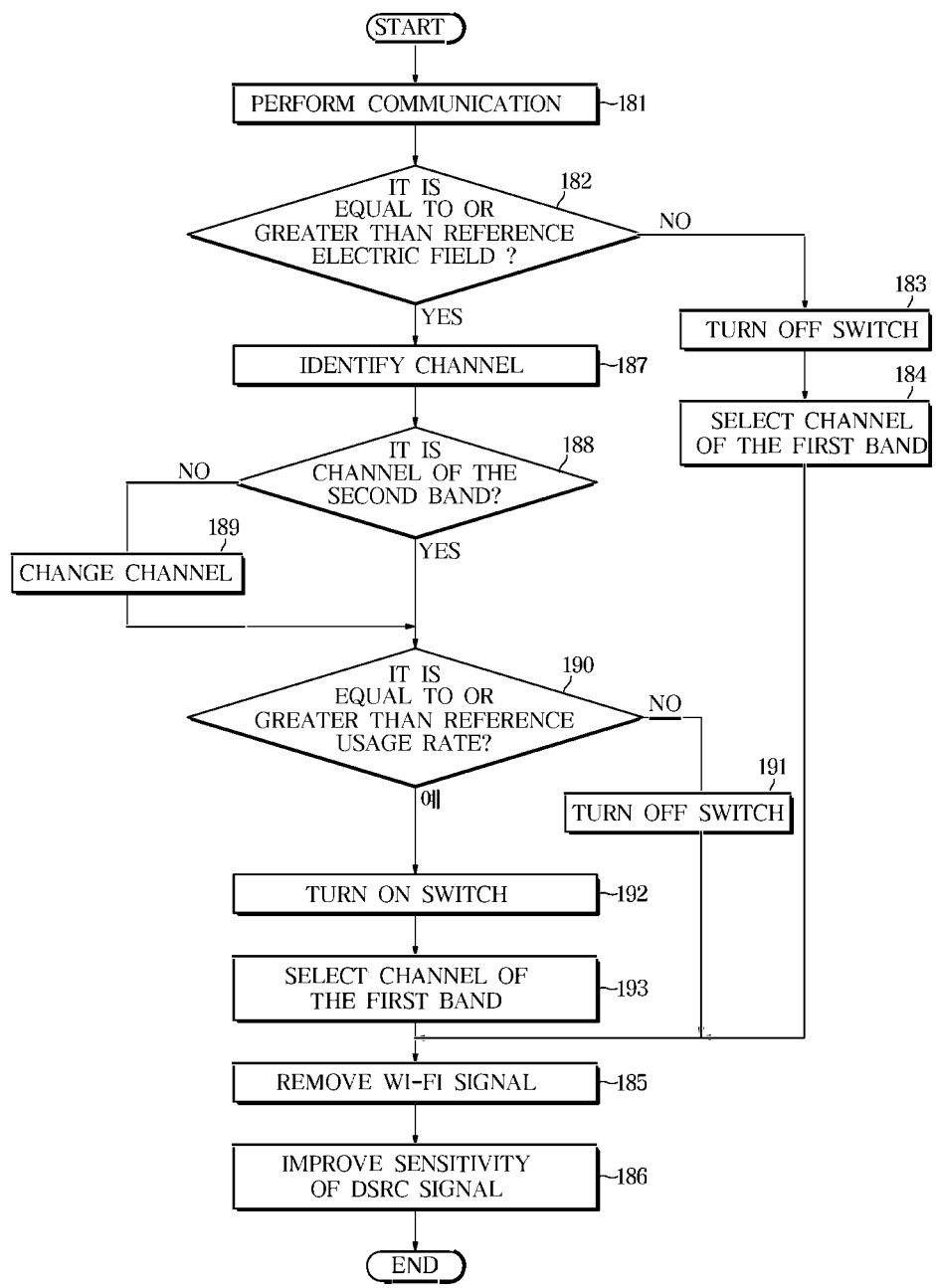
FIG. 6 is a flowchart illustrating the vehicle in one form of the present disclosure.

FIG. 6 is a flowchart illustrating the vehicle in some forms of the present disclosure, and it will be described with reference to FIGS. 7 to 13.

While performing the communication with the other vehicle 2 and the infrastructure 3 by using DSRC corresponding to the first communication method, the vehicle 1 may collect road conditions information, and change navigation information displayed on the display 132 based on the collected road conditions information.

In addition, the vehicle 1 may perform autonomous driving by the controlling operations of the drive system based on the collected road conditions information.

The vehicle 1 may identify whether a communication signal for Wi-Fi communication is contained in a communication signal received via the communication apparatus 160.

The identification whether a communication signal for Wi-Fi communication is contained in a communication signal may include identifying whether a unique signal for Wi-Fi communication is contained in the received communication signal.

In addition, the identification whether a communication signal for Wi-Fi communication is contained in a communication signal may include identifying whether a protocol of the received communication signal is a protocol for Wi-Fi communication.

When receiving the region information on whether the region is the Wi-Fi communication region or not, from the infrastructure 3, the vehicle 1 may identify whether a communication signal for Wi-Fi communication is contained in a communication signal.

When it is identified that the communication signal for Wi-Fi communication is contained in the communication signal, the vehicle may identify an electric field of the communication signal for Wi-Fi communication corresponding on a peak of the communication signal detected by the peak detector, and identify whether the identified electric field of the communication signal for Wi-Fi communication is equal to or greater than the reference electric field (182).

In addition, when it is identified that the communication signal for Wi-Fi communication is contained in the received communication signal and when peak detection information is output from the peak detector, the vehicle may identify that the identified electric field of the communication signal for Wi-Fi communication is equal to or greater than the reference electric field.

The peak detector may be a detector configured to detect only a peak of communication signal for Wi-Fi communication. That is, when peak detection information is output from the peak detector, the vehicle may identify that the identified electric field of the communication signal for Wi-Fi communication is equal to or greater than the reference electric field.

That is, the vehicle may identify whether an electric field of the communication signal for Wi-Fi communication is the strong electric field.

The vehicle may receive entry information of the strong electric field region from the infrastructure 3, wherein entry information of the strong electric field region indicates that the vehicle enters the strong electric field region in which the electric field of the communication signal for Wi-Fi communication is equal to or greater than the reference electric field.

When it is identified that the electric field of the communication signal for Wi-Fi communication contained in the received communication signal is less than the reference electric field, the vehicle may identify that the region is the weak electric field region and turn off the switch 167 of the communication apparatus (183).

The vehicle may select any one channel from the plurality of channels having the frequency of the first band (184) and perform the communication with the other vehicle 2 using the selected channel.

Figure 7:
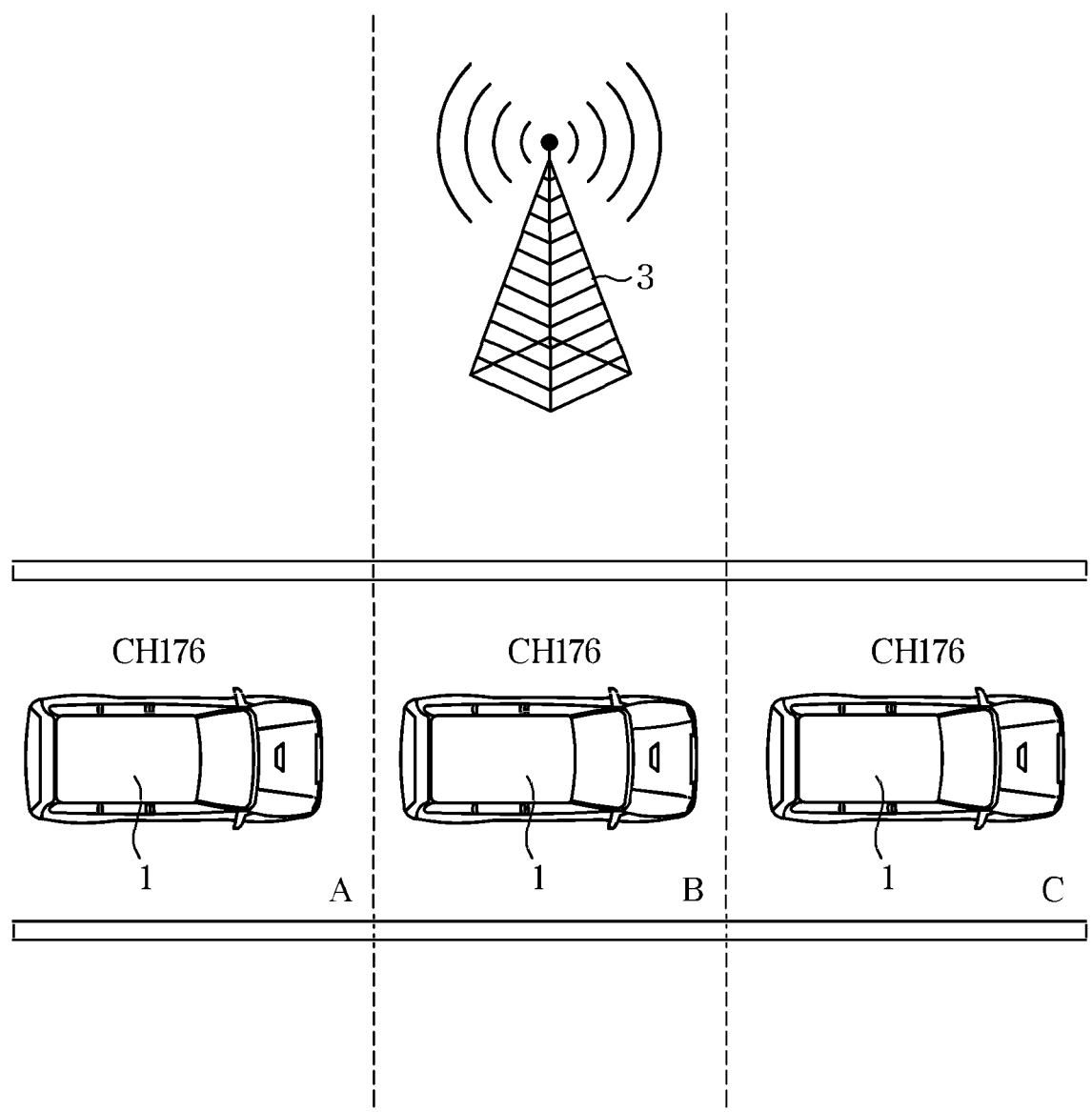
FIG. 7 is a view illustrating a channel selection of the communication apparatus in a weak electric field region upon the communication of the vehicle in one form of the present disclosure.

As illustrated in FIG. 7, when a communication signal for Wi-Fi communication output from the infrastructure is the weak electric field although the vehicle enters a region (B) in which the infrastructure is installed, the vehicle 1 may select any on channel among the plurality of channels having the frequency of the first band, and perform the communication with other vehicle in a region (c), which is beyond the region in which the infrastructure is installed, using the same channel as the region (B).

In addition, when a communication signal for Wi-Fi communication output from the infrastructure is the weak electric field although the vehicle enters the region (B) in which the infrastructure is installed, the vehicle 1 may perform the communication with other vehicle in the region (B) using a channel the same channel as a previous region (A).

When the communication signal received via the antenna 160*a* incudes a communication signal for DSRC and a communication signal for Wi-Fi communication having the weak electric field, as illustrated in FIG. 8A, the vehicle 1 may acquire the communication signal for Wi-Fi communication from the received communication signal, as illustrated in FIG. 8B, and remove the communication signal for Wi-Fi communication by treating the communication signal for Wi-Fi communication as the noise (185), as illustrated in FIG. 8C, thereby increasing the sensitivity of the communication signal for DSRC (186).

That a communication signal for Wi-Fi communication is contained may include a fact that there is a communication signal for Wi-Fi communication performing a communication by using a frequency that is the same as a frequency of a communication signal for DSRC.

In addition, the vehicle may control the denoise filter of the communication apparatus to remove the acquired communication signal for Wi-Fi communication by treating the acquired communication signal for Wi-Fi communication as the noise. That is, the vehicle may transmit noise removal information corresponding to the communication signal for Wi-Fi communication, to the denoise filter, so as to remove the noise removal information in the communication signal received in the denoise filter.

When it is identified that the electric field of the communication signal for Wi-Fi communication is equal to or greater than the reference electric field, the vehicle may identify a cannel of the communication apparatus (187), and identify which one channel among the plurality of channels having the frequency of the second band is the identified channel (188). When it is identified that the identified channel is a channel having the frequency of the first band, the vehicle may change the channel of the communication apparatus into any one channel among the channels having the frequency of the second band (189).

Changing the channel into any one of the channels having the frequency of the second band may include receiving information on a channel having the frequency of the second band from other vehicle in the strong electric field region, and changing the channel of the communication apparatus based on the received channel information.

In addition, changing the channel into any one of the channels having the frequency of the second band may include receiving information on a channel having the frequency of the second band from the infrastructure 3 in the strong electric field region, and changing the channel of the communication apparatus based on the received channel information.

When it is identified that the channel of the communication apparatus is any one of the channels having the frequency of the second band, the vehicle may identify the usage rate of the channels of the second band in a region in which the vehicle is currently placed, and identify whether the identified usage rate exceeds the reference usage rate (190).

When it is identified that the identified usage rate is equal to or less than the reference usage rate, the vehicle may turn off the switch (191).

The vehicle may perform the communication with the other vehicle 2 by using any one of the plurality of channels having the frequency of the second band.

Figure 9:
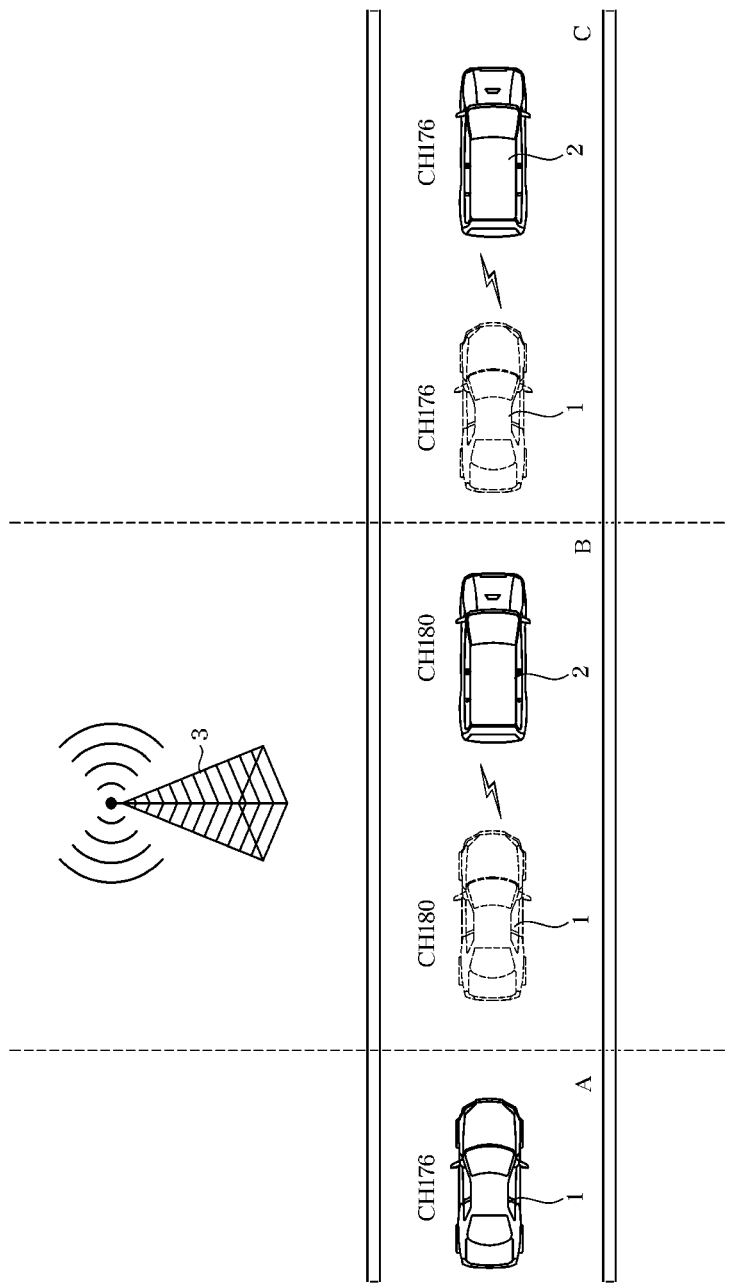
FIG. 9 is a view illustrating a channel assignment of the communication apparatus in a strong electric field region upon the communication of the vehicle in one form of the present disclosure.

As illustrated in FIG. 9, in the region (A), which is before the region (B) in which the infrastructure is installed, the vehicle 1 may receive information on any one channel among the channels having the frequency of the second band, from other vehicle in the region (B) in which the infrastructure is installed. When the vehicle enters the region (B), the vehicle may change the channel of the communication apparatus based on the received channel information.

When the vehicle is out of the region (B) in which the infrastructure is installed, the vehicle may receive information on any one channel among the channels having the frequency of the first band, from other vehicle in the region (C) beyond the strong electric field region, and change the channel of the communication apparatus based on the received channel information.

In addition, when the vehicle is out of the strong electric field region (B) in which the infrastructure is installed, the vehicle may change the channel into the channel that is set in the region (A) before the strong electric field region (B).

When the communication signal for Wi-Fi communication output from the infrastructure is the strong electric field, the above mentioned vehicle may perform the communication with other vehicle by using the channel having the frequency of the second band only in the strong electric field region (B) in which the infrastructure is installed.

As illustrated in FIG. 10A, the vehicle 1 may receive a communication signal for DSRC and a communication signal for Wi-Fi communication which have a different frequency, through the antenna 160a when the channel of the communication apparatus is changed into the channel having the frequency of the second band in the strong electric field region.

The vehicle 1 may acquire the communication signal for Wi-Fi communication from the received communication signal, as illustrated in FIG. 10B, and remove the communication signal for Wi-Fi communication by treating the communication signal for Wi-Fi communication as the noise (185), as illustrated in FIG. 10C, thereby increasing the sensitivity of the communication signal for DSRC (186)

When it is identified that the identified usage rate exceeds the reference usage rate, the vehicle may turn on the switch (192), select any one of the plurality of channels having the frequency of the first band (193), and change the channel of the communication apparatus into the selected channel.

The vehicle may perform the communication with the other vehicle 2 by using any one of the plurality of channels having the frequency of the first band.

Figure 11:
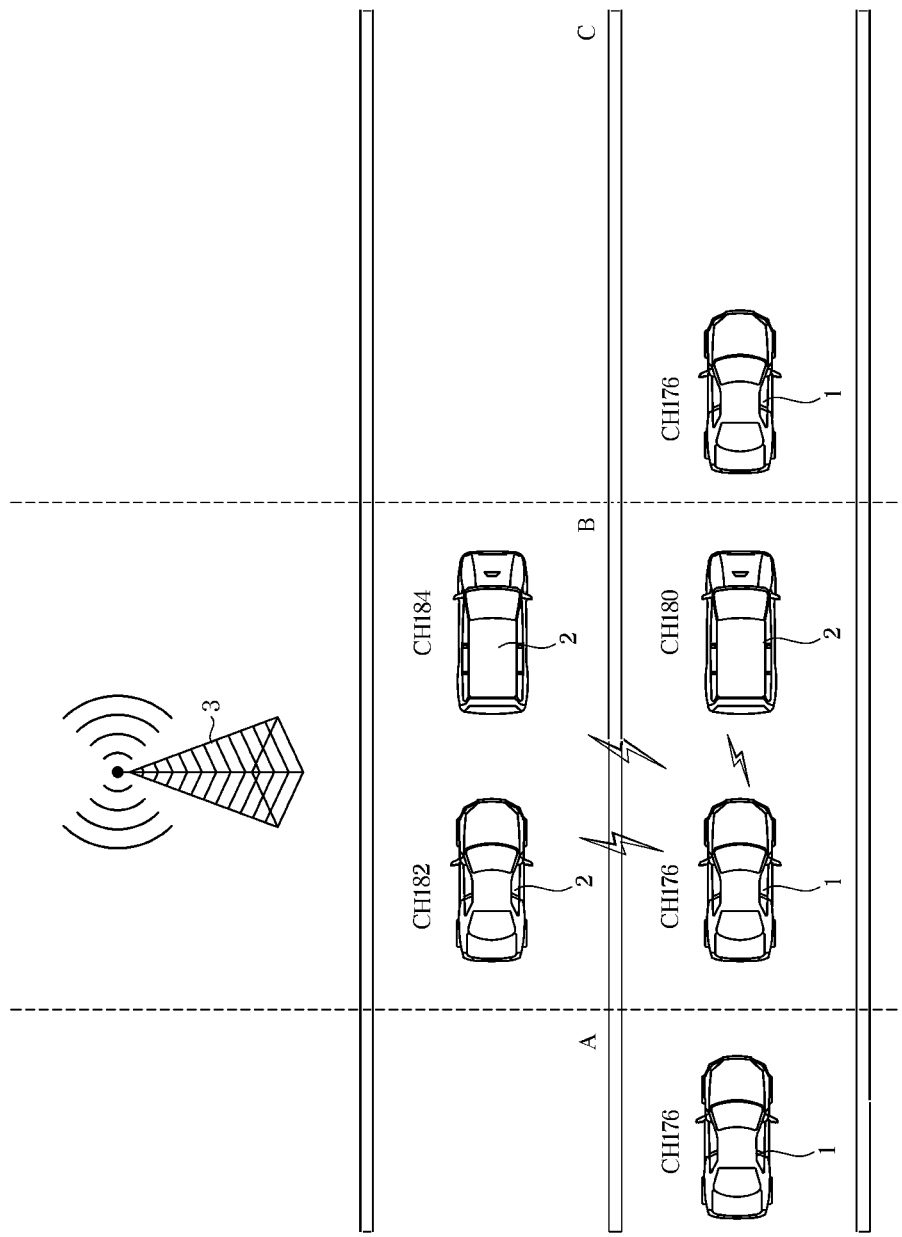
FIG. 11 is a view illustrating channel change of the communication apparatus in a strong electric field region upon the communication of the vehicle in one form of the present disclosure.

As illustrated in FIG. 11, when it is identified that a plurality of other vehicles use all channels having the frequency of the second band in a region (B) in which the communication signal for Wi-Fi communication is the strong electric field, the vehicle may select any one channel from the channels using the frequency of the first band.

In addition, when receiving information indicating that the usage rate of the channels having the frequency of the second band exceeds the reference usage rate, from the infrastructure 3, the vehicle may select any one channel from the channels using the frequency of the first band.

As illustrated in FIG. 12A, when the channel of the communication apparatus is changed into the channel having the frequency of the first band in the strong electric field, the vehicle 1 may receive a communication signal for DSRC and a communication signal for Wi-Fi communication which have the same frequency, through the antenna 160a.

The vehicle may acquire the communication signal for Wi-Fi communication passing through the band pass filter, as illustrated in FIG. 12B. The vehicle may transmit the acquired communication signal for Wi-Fi communication to the subtractor 164 to subtract the communication signal for Wi-Fi communication from the communication signal passing through the buffer, thereby removing the communication signal for Wi-Fi communication and increasing the sensitivity of the communication signal for DSRC by the denoise filter (166).

Figure 13:
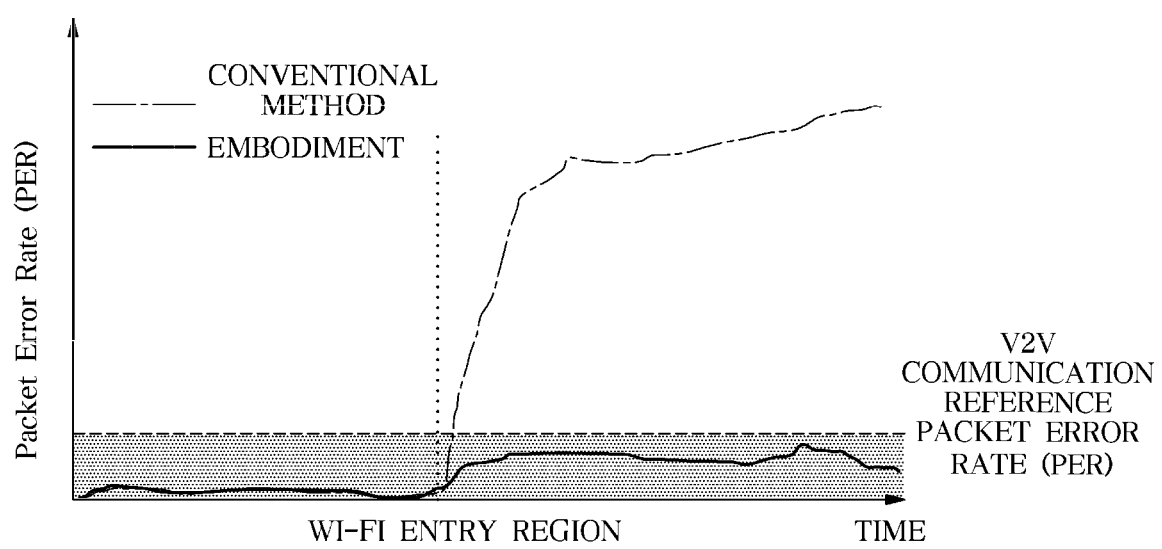
FIG. 13 is a graph illustrating a packet error rate according to a conventional vehicle communication and a packet error rate according to the vehicle communication in one form of the present disclosure.

As illustrated in FIG. 13, it may be possible to reduce the interference caused by the communication signal for Wi-Fi communication, by changing the channel of the communication apparatus according to the electric field intensity of the infrastructure and according to the channel usage rate having the frequency of the second band, and by removing the communication signal for Wi-Fi communication received in the communication apparatus. Therefore, it may be possible to reduce the packet error rate when the vehicle performs DSRC after entering the region in which the infrastructure, which transmits and receives the communication signal for Wi-Fi communication, is installed.

As is apparent from the above description, according to the communication apparatus, vehicle having the same, and method for controlling the vehicle, it may be possible to improve the performance of V2V communication, by removing the interference of the signal of Wi-Fi signal using the frequency band, which is the same as the communication apparatus for V2V communication based on DSRC.

In addition, it may be possible to remove a noise, which is left after removing the interference of the Wi-Fi signal through the denoise filter and the averaging method, thereby improving the performance of the signal to noise ratio (SIN).

Therefore, it may be possible to secure the reliable packet error rate (PER) of the communication apparatus for V2V communication in \Ni-Fi environment, thereby improving the quality of the communication among vehicles.

In addition, by using the stable communication among vehicles, it may be possible to reduce the risk of the collision with the obstacle and to improve the safety of the vehicle.

As mentioned above, it may be possible to improve the quality and merchantability of the vehicle communicating with another vehicle. Further, it may be possible to improve the satisfaction and the convenience of the user, and to secure the safety of the vehicle and the competitiveness of the product.

Although a few forms of the present disclosure have been shown and described, it would be appreciated by those skilled in the art that changes may be made in these forms without departing from the principles and spirit of the disclosure, the scope of which is defined in the claims and their equivalents.

What is claimed is:

1. A communication apparatus comprising:
   a band pass filter configured to transmit a communication signal having a frequency equal to or greater than a preselected frequency among communication signals received by an antenna;
   a peak detector configured to detect a peak of a communication signal using a second communication protocol among the communication signals received by the antenna;
   a subtractor connected to the band pass filter and configured to subtract the communication signal using the second communication protocol from the communication signals received by the antenna;
   a switch provided between the subtractor and the peak detector, wherein the switch is configured to operate based on the peak of the communication signal using the second communication protocol detected by the peak detector and transmit the communication signal using the second communication protocol to the subtractor when the switch is in an on-operation; and
   a denoise filter configured to remove a noise from the communication signals received by the antenna, increase a sensitivity of a communication signal using a first communication protocol, and remove the communication signal using the second communication protocol among the communication signals received by the antenna by treating the communication signal using the second communication protocol as noise.

2. The communication apparatus of claim 1, wherein the first communication protocol is Dedicated Short Range Communication (DSRC) and the second communication protocol is Wi-Fi.

3. The communication apparatus of claim 2, wherein the antenna is configured to:
   receive a communication signal having a frequency of a first band of DSRC; and receive a communication signal having a frequency of a first band of Wi-Fi communication.

4. The communication apparatus of claim 3, wherein the communication apparatus further comprises a buffer provided between the band pass filter and the subtractor and configured to synchronize a communication signal for Wi-Fi communication transmitted from the switch with a communication signal for Wi-Fi communication transmitted from the band pass filter.

5. The communication apparatus of claim 2, wherein bandpass filter is configured to receive a first communication signal having a frequency of a first band of the first communication protocol and a second communication signal having a frequency of a second band of the second communication protocol.

6. The communication apparatus of claim 5, further comprising a controller configured to:
 allow the communication apparatus to communicate by using the frequency of the first band when an electric field of the second communication signal is less than a reference electric field;
 identify a usage rate of the frequency of the second band when the electric field of the second communication signal is equal to or greater than the reference electric field;
 allow the communication apparatus to communicate by using the frequency of the second band when the usage rate of the frequency of the second band is equal to or less than a reference usage rate; and
 allow the communication apparatus to communicate by using the frequency of the first band when the usage rate of the frequency of the second band exceeds the reference usage rate.

7. The communication apparatus of claim 6, wherein the controller is further configured to:
 receive electric field intensity information of a particular region from another vehicle; and
 identify whether the particular region is a strong electric field region or a weak electric field region of the communication signal of the second communication form based on the electric field intensity information.

8. The communication apparatus of claim 7, wherein the controller is configured to receive the frequency of the second band from the other vehicle leaving the particular region when it is identified that the particular region is the strong electric field region of the communication signal of the second communication protocol.

9. The communication apparatus of claim 6, wherein the controller is further configured to:
 receive electric field intensity information of a particular region from an infrastructure; and
 identify whether the particular region is a strong electric field region or a weak electric field region of the communication signal of the second communication form based on the electric field intensity information.

10. The communication apparatus of claim 5, wherein the controller is configured to change a channel of the communication apparatus based on channel information after the channel information is received from an infrastructure, wherein the channel information is information regarding a channel of a plurality of channels having the frequency of the second band.

11. The communication apparatus of claim 5, wherein the controller is configured to turn off the switch to prevent the communication signal of the second communication form from being transmitted to the subtractor when an electric field of the communication signal of the second communication protocol is less than a reference electric field.

12. The communication apparatus of claim 5, wherein the controller is configured to turn off the switch to prevent the communication signal of the second communication protocol from being transmitted to the subtractor when an electric field of the communication signal of the second communication protocol is greater than or equal a reference electric field and a usage rate of the frequency of the second band is less than or equal a reference usage rate.

* * * * *